United States Patent [19]

Lee et al.

[11] Patent Number: 5,023,036
[45] Date of Patent: Jun. 11, 1991

[54] METHOD OF MANUFACTURING ELECTROSTATIC DISSIPATING COMPOSITION

[75] Inventors: Biing-Lin Lee, Broadway Heights; Francis R. Sullivan, Cleveland Heights; Elaine Audrey Mertzel, Rocky River, all of Ohio

[73] Assignee: The BF Goodrich Company, Akron, Ohio

[21] Appl. No.: 379,393

[22] Filed: Jul. 13, 1989

[51] Int. Cl.$^5$ .................. B29C 47/36; B29B 11/10
[52] U.S. Cl. .................. 264/211.23; 264/331.11; 264/331.12; 264/349; 525/64.187
[58] Field of Search ............. 264/211.23, 349, 331.11, 264/331.12, 210.6, 211.12; 525/64, 65, 187

[56] References Cited

U.S. PATENT DOCUMENTS

| | | | |
|---|---|---|---|
| 3,398,014 | 8/1969 | Turner | 264/211.12 |
| 3,772,403 | 11/1973 | Wells | 264/210.6 |
| 3,873,639 | 3/1975 | Crescentini et al. | 264/210.6 |
| 4,151,159 | 4/1979 | Geall et al. | 264/210.6 |
| 4,230,827 | 10/1980 | Myers | 525/121 |
| 4,663,103 | 5/1987 | McCullough et al. | 264/211.23 |

*Primary Examiner*—Jeffery Thurlow
*Attorney, Agent, or Firm*—Konrad H. Kaeding; Daniel J. Hudak

[57] ABSTRACT

A method of manufacturing an electrostatic dissipating material (and compositions derived therefrom), wherein the method relates to:

heat mixing or blending a first, a second and a third component in two steps, whereby in the first step the second and third components are first heat mixed or blended together to provide an initial mixture, and in a second step the first component is heat mixed or blended with said initial mixture, the first component is a polyolefinic, urethane, condensation, vinylic or styrenic polymer, the second component is a oxirane copolymer, and the third component is a polymer additive.

6 Claims, No Drawings

METHOD OF MANUFACTURING ELECTROSTATIC DISSIPATING COMPOSITION

BACKGROUND OF THE INVENTION

1. Field Of The Invention

The present invention relates to electrostatic dissipating polymeric blends having improved properties. More specifically the composition and method of this invention is directed to an innovative two step blending process (and a composition derived therefrom) which surprisingly provides improved performance.

2. Discussion Of The Prior Art

Plastics are often considered for use as electrical insulating materials, because they typically do not readily conduct electrical current and are generally rather inexpensive relative to other known insulating materials. A number of known plastics are sufficiently durable and heat resistant to provide at least some electrical insulating utility, but many such plastics are problematic due to the accumulation of electrostatic charge on the surface of the material.

The accumulation of surface charge on an insulating material is undesirable for various reasons. Such materials sometimes discharge very quickly, and this can damage electronic components, or cause fires or explosions, depending upon the environment. Sudden static discharge can also be an annoyance to those using the material.

Even where sudden static discharge is not a problem, dust will typically be attracted to and will accumulate on materials carrying a static charge. Furthermore, the static charge can interfere with sensitive electronic components or devices and the like.

Consequently, a need exists for electrostatic dissipating polymeric compositions having an appropriate resistivity. That is, polymeric compositions must have sufficient resistivity to cause the "bleeding off" or dissipation of any occurring static charge. The resistivity must not be so low as to allow the charge to move too quickly through the material, thereby causing an arc or spark. On the other hand, the resistivity must not be so great as to cause the charge to build up to such a high level as to ultimately cause a sudden discharge (spark or arc).

Resistivity can be further defined as involving surface resistivity and volume resistivity. If the volume resistivity is in an appropriate range, an alternative pathway is provided through which a charge can dissipate. However, many conventional electrostatic dissipative materials, particularly materials comprising low molecular weight antistatic agents, provide electrostatic dissipative properties primarily by means of surface resistivity. As a result, surface resistivity is typically the primary focus for electrostatic dissipating materials.

Surface resistivity is an electrical resistance measurement (typically measured in Ohms per square) taken at the surface of a material at room temperature. Where the surface resistivity is less than or equal to about $10^5$, the composition's surface has very little insulating ability and is generally considered to be conductive. Such compositions are generally poor electrostatic dissipating polymeric materials, because the rate of bleed off is too high and sparking or arcing can occur.

Where the surface resistivity is greater than $10^{12}$, the composition's surface is generally considered to be an insulator. In certain applications, such a composition is also a poor electrostatic dissipating material, because the surface does not have the requisite amount of conductivity necessary to dissipate static charge.

Typically where the surface resistivity is about $10^5$ to $10^{12}$, any charge contacting the surface will readily dissipate or "decay". Further information involving the evaluation of surface resistivity can be found in American Standard Test Method D257.

Static charge decay rates measure the ability of an electrostatic dissipating material to dissipate charge. A 90% decay time as used herein is measured at about 15% relative humidity and at ambient temperature as follows: 1. a 5 kVolt charge is placed upon the material and the amount of time (in seconds) for the charge to dissipate to 500 Volts is measured. A 99% decay time is measured substantially as for the 90% decay time, except that the amount of time measured is for the charge to dissipate to 50 Volts.

Many electrostatic dissipating materials generally found in the art have a 90% decay time of greater than about 3 seconds and a 99% decay time of greater than about 5 seconds. However, the National Fire Protection Association standard (NFPA Code 56A) requires 0.5 seconds as an upper limit for a 90% decay time, and the U.S. Military Standard (MIL-81705B) requires 2.0 seconds as an upper limit for a 99% decay time.

Attempts have been made to coat an electrostatic dissipative material onto an insulating plastic to reduce the accumulation of static charge. Surface applications however have been problematic due to long term adhesion requirements and interference with surface properties.

Other attempts to reduce the accumulation of static charge include the addition of graphite, metals, organic semiconductors or other low molecular weight antistatic agents. However, problems have arisen relating to the processability and/or the physical properties of the resulting product.

Rigid additives, such as metal and graphite, often deteriorate the physical and mechanical properties of the plastic. Such additives can also be expensive and make processing difficult.

Conventional low molecular weight electrostatic additives typically work well only in the presence of high relative humidity. Such additives typically must bloom to the surface after blending or mixing to provide electrostatic dissipative performance, and such blooming may not always be consistent or may cause thermal stability problems or may cause physical properties to deteriorate. Such additives can also create an undesirable film or can wash away or abrade from the surface.

Low molecular weight electrostatic dissipating additives generally can be blended with polymers having a high glass transition temperature, such as rigid polyvinyl chloride (PVC), polystyrene, acrylonitrile-butadiene-styrene (ABS), styrene-acrylonitrile (SAN), and styrene-maleic anhydride (SMA); however the high glass transition temperature of such plastics typically hinders subsequent migration of the electrostatic dissipating additives to the surface of the cooled parts, and such migration is typically necessary to obtain desired electrostatic properties. Blending may also require such high temperatures as to cause discoloration, instability and degradation of the material.

The following patents relate to the incorporation of high molecular weight (polymeric) electrostatic dissipating agents into plastic.

Federal et al U.S. Pat. No. 4,588,773 discloses an electrostatic dissipating thermoplastic composition comprising a copolymer of acrylonitrile, butadiene, and styrene (ABS) and a copolymer of epihalohydrin. The claimed composition is defined as having more than 20% by weight of the epihalohydrin copolymer.

Kipouras et al U.S. Pat. No. 4,775,716 discloses an electrostatic dissipating ABS blend comprising epihalohydrin-oxirane copolymer wherein the amount of ABS is 80% by weight or more. The required ratio of epihalohydrin to oxirane is defined as being between about 1:19 to about 7:13 by weight.

Barnhouse et al U.S. Pat. No. 4,719,263 discloses an electrostatic dissipating composition comprising an epihalohydrin homopolymer or copolymer and chlorinated polyvinyl chloride, polycarbonate, polyester, epoxy, phenolics, or mixtures thereof.

Published Yu European application 282,985 discloses a copolymer of epihalohydrin and ethylene oxide as an electrostatic dissipating additive. The preferred composition is defined as being at least 60% by weight ethylene oxide.

Yu U.S. application No. 039,258, filing date Apr. 17, 1987, is directed to an electrostatic dissipating polymeric composition comprising an electrostatic dissipating copolymer of ethylene oxide and a comonomer selected from the group consisting of cyclic ethers, cyclic acetals, and cyclic esters. The polymeric composition can further comprise any thermoplastic, thermoplastic elastomer or elastomer.

Published European application 294,722 discloses the use of polymethylmethacrylate (PMMA) in blends of SAN containing epichlorohydrin copolymer.

Myers U.S. Pat. No. 4,230,827 discloses ethylene oxide polymers as being useful as impact modifiers for PVC. The Myers patent teaches that the ethylene oxide polymer must be comprised of at least about 80 percent by weight ethylene oxide. The ethylene oxide polymer is further defined as having a viscosity average molecular weight of about 200,000 to about 10,000,000.

None of the above prior art teachings suggest or disclose the innovative two-step blending process of the present invention wherein unexpected improved electrostatic dissipating properties are imparted while also maintaining or improving impact strength, tensile properties and the like.

OBJECTS OF THE INVENTION

It is an object of the present invention to provide a relatively inexpensive, easy to manufacture, useful electrostatic dissipating polymer blend which has high impact strength and excellent tensile properties.

A further object of the present invention is to provide an electrostatic dissipating material having a 90% decay time of less than about 0.5 seconds and a 99% decay time of less than about 2.0 seconds.

Other objects and features of the present invention will become apparent to one of ordinary skill in the art upon further reading of this specification and accompanying claims.

SUMMARY OF THE INVENTION

A method of manufacturing an electrostatic dissipating material (and compositions derived therefrom), wherein the method comprises:

heat mixing or blending a first, a second and a third component in two steps, whereby in a first step, the second and third components are heat mixed or blended together, and then in a second step the first component is heat mixed or blended with the mixture comprising the second and third components, wherein the first component comprises a polyolefinic, urethane, condensation, vinylic or styrenic polymer, the second component comprises an oxirane copolymer, and the third component comprises a polymer additive.

DETAILED DESCRIPTION OF THE PREFERRED EMBODIMENT

1. First Component

The preferred embodiment of the present invention is directed generally to blends having a first component comprising any polymer and preferably comprising a polyolefinic, urethane, condensation, vinylic or styrenic polymer or a mixture thereof. Preferred polyolefins include high density polyethylene, low density polyethylene, very low density polyethylene, linear low density polyethylene, polypropylene, polybutene, polycycloolefin, ethylene-propylene terpolymer, grafted variations thereof and the like.

Preferred urethanes include polyester and polyether urethanes. Preferred condensation polymers include polycarbonate, polyesters, and polyamides. Preferred styrenic polymers include polystyrene, high impact polystyrene (HIPS), styrene-methyl methacrylate (SMMA), acrylonitrile-butadiene-styrene (ABS), styrene-acrylonitrile (SAN), and styrene-maleic anhydride (SMA).

Preferred vinyl polymers include: 1. acrylates, such as homo and copolymers substantially derived from the following monomers—acrylic acid, methacrylic acid, methyl methacrylate, ethyl acrylate, propyl acrylate, butyl acrylate, 2-ethylhexyl acrylate, and acrylic monomers that contain hydroxyl, epoxy or halogen moieties; 2. polyvinyl chloride (PVC); 3. chlorinated polyvinyl chloride (CPVC); and 4. polyvinyl acetate.

The preferred polyolefin is polyethylene or polypropylene. The preferred urethane is polyester. The preferred condensation polymer is a polyamide. The preferred styrenic polymer is ABS, and the preferred vinylic polymer is PVC. The GPC weight average molecular weight for the first component is preferably greater than 10,000 relative to a polystyrene standard.

The first component can also comprise secondary ingredients such as stabilizers and the like. Such additives are well known in the art and can be used in typical amounts, provided they do not deleteriously effect the performance of the final product. Appropriate secondary components can be determined using ordinary skill and experimentation, depending upon what polymer(s) is(are) chosen for use as part of the first component.

Nothing has been discovered which would suggest that other polymers could not also be used as the first component of this invention. For a particular application or performance requirement, certain polymers might work better than others. However, this would have to be determined using ordinary skill and experimentation after reading this specification and accompanying claims. Due to the wide variety of possible applications of this invention, it would be impossible to list each and every possible embodiment.

2. Second Component

The present invention further comprises a second component which is an electrostatic dissipating oxirane copolymer. The oxirane copolymer preferably comprises the electrostatic dissipating polymer product of the following comonomers:

i) ethylene oxide in the range from about 5% to about 95% by weight; and ii) at least one heterocyclic comonomer in the range of from about 95% to about 5% by weight, whereby the cyclic comonomer comprises a ring comprising an oxygen atom and at least 2 carbon atoms, wherein the ring is either free of pendant groups or comprises a pendant group which is further defined as a substituted or unsubstituted, saturated, unsaturated or partially saturated: a) aliphatic, particularly alkyls and haloalkyls; b) cycloaliphatic; c) aromatic; or d) combinations thereof.

The preferred ethylene oxide copolymer comprises ethylene oxide and epihalohydrin or propylene oxide. The most preferred ethylene oxide copolymer comprises ethylene oxide and epichlorohydrin in a weight ratio of about 80:20.

3. The Third Component

The preferred embodiment further comprises a third component which comprises an appropriate blend additive. Depending upon the first and second components of the blend, this third component could be a plasticizer, stabilizer, antioxidant, antiozonant, filler, fiber, impact modifier and/or the like. Useful blending or compounding additives are well known in the art, and appropriate additives and amounts can be determined using ordinary experimentation. Although such blend additives typically have no electrostatic dissipating properties by themselves, they have been surprisingly found to enhance electrostatic dissipating and other properties when used according to the present invention.

4. Blending

The most preferred first component comprises PVC and one or more conventional PVC stabilizers, additives or the like. The most preferred second component comprises ethylene oxide/epichlorohydrin (EO/ECH) copolymer having a preferred weight ratio of about 4:1, and the most preferred third component comprises any conventional antioxidant, such as IRGANOX 1010 by Ciba Geigy. The three components are preferably blended together in a two step process wherein the second and third components are initially heat mixed or blended together and the first component is then heat mixed or blended with the material comprising the second and third component.

The two step blending process has been unexpectedly found to provide an end product having superior electrostatic dissipative, tensile and/or impact properties than the end product arising from a single step blending. Furthermore, the two step method has been found in some cases to improve the volatilizing off of unwanted solvent, contaminants or the like which might be found in any of the three components.

Preferably, the blending is accomplished at a temperature greater than the melting temperature of the components being mixed. The most preferred temperature is that which would be high enough to volatilize off any unwanted contaminants within the components without deleteriously effecting the material (i.e., thermal decomposition). The most preferred temperature for any particular embodiment can be determined using ordinary skill and conventional experimentation.

The term "mixing" as used herein is intended to include any type of physical contacting between components, such as extrusion, milling, stirring and the like. A two step extrusion could be conducted by adding components at different ports along the extrusion screw. It would be impossible to list each and every type of mixing or mixing operation which would be applicable for the present invention, and certain types of mixing may have to be determined using ordinary skill and experimentation.

EXAMPLES

The invention will be better understood after review of the following examples.

EXAMPLE 1A

One step and two step blends were made from the following components. The first component comprised commercial grade PVC, a thermal stabilizer, and other conventional additives. The second component comprised ethylene oxide/epichlorohydrin (EO/ECH) copolymer comprising about 76% by weight EO, and the third component comprised an antioxidant, IRGANOX 1010 by Ciba Geigy and a processing aid.

For the one step blends all of the components were heat mixed at once. For the two step blends, the second and third components were heat mixed in a first step and the first component was then added in a second step. All blending was done using a ribbon blender at about 80° C. Blending time was about 20 minutes for each step of the two step blend (or for the one step in the one step blend). All samples comprised about 80 weight parts PVC (first component), about 15 weight parts EO/ECH (second component), about 2 weight parts antioxidant, IRGANOX 1010 by Ciba Geigy (third component) and about 5 weight parts processing aid. The resulting blends were mixed, pelletized and then injection molded.

All samples were conditioned for 24 hours at 15% relative humidity prior to electrostatic dissipating measurement. Temperature cycle testing was conducted for one sample by placing the sample in a room temperature environment (55% relative humidity) for about 1.75 hours, then gradually altering the environment to 60° C. (95% relative humidity) over the course of about 1.5 hours and held in the 60° C. environment for about 4 hours and then gradually allowed to cool to room temperature over the course of 0.75 hours to complete the cycle; 21 such cycles were performed consecutively to the "cycle tested" sample. Other samples were placed in 60° C. and 70° C. dry forced air ovens for various periods of time to determine heat aging properties. The results of these experiments are provided in Table 1.

TABLE 1

|  | One Step Processing | | Two Step Processing | |
| --- | --- | --- | --- | --- |
| Volts: | 5000 to 0 | 5000 to 500 | 5000 to 0 | 5000 to 500 |
| Cutoff: | 0% | 10% | 0% | 10% |
| Decay Time (in seconds) | 0.93 | 0.09 | 0.30 | 0.02 |
| After Cycle Testing |  |  |  |  |
| 60° C. |  |  |  |  |
| 112 hrs |  |  | 1.31 | 0.06 |
| 16 hrs |  |  | 0.71 | 0.06 |
| 9 hrs | 2.26 | 0.26 |  |  |
| 70° C. |  |  |  |  |
| 19 hrs |  |  | 1.25 | 0.07 |
| 7 hrs | 1.71 | 0.13 |  |  |
| Control* | 1.18 | 0.13 | 0.31 | 0.02 |

*No heat aging or cycle testing.

As can be seen by Table 1, the two step blending process improved static decay rates as compared to one step blending. The improvement can be seen where the material is cycled over temperature extremes and also when the sample is placed in a high temperature environment for extended periods of time.

EXAMPLE 1B

TWO STEP SAMPLE: In a first step, about 100 weight parts (all "parts" are by weight unless otherwise indicated) of EO/ECH copolymer (having an EO:ECH weight ratio of about 80:20) was mixed with 3 parts thermal stabilizer and 1 part antioxidant using a 2 roll mill at a temperature of about 140° C. to form a "first mixture". In a second step 24 parts of this first mixture was melt blended with 80 parts PVC and 3 parts thermal stabilizer at a temperature of about 190° C. The resulting material was compression molded and had a 90% decay time of 0.14 seconds and a 99% decay time of 0.43 seconds.

ONE STEP SAMPLE: The components used in the two step sample identified above were each mixed together in a single step using a 2 roll mill at a temperature of about 190° C. The resulting material was compression molded and had a 90% decay time of 0.67 (more than 3 times greater than for the two step sample) and a 99% decay time of 3.67 seconds (more than eight times greater than for the two step sample).

EXAMPLES 2-13

Regarding the following examples (2-13), blending was accomplished by mechanically melt mixing the indicated ingredients in a 4 inch electric heated mill at 200° C. for about 2 minutes and compression molding at 200° C. for one and a half minutes in a laboratory press.

All parts are by weight unless otherwise indicated. Parenthesis are used to indicate two step mixing wherein (A+B)+C indicates that A and B were mixed in a first step and the resulting A+B mixture was then mixed with C in a second step. Accordingly, A+B+C indicates that the three components were mixed in a single step.

INGREDIENTS

The following are a list of ingredients used in certain of the samples.

1. POLYPROPYLENE+EO/ECH: 100 parts of a modified polypropylene copolymer, PROFAX SB 222 manufactured by Himont Corporation, was heat mixed with: a) 2 parts antioxidant, IRGANOX 1010 by Ciba Geigy (hereafter referred to as "antioxidant"); b) 100 parts of a copolymer of ethylene oxide/epichlorohydrin ("EO/ECH") in a weight ratio of about 80:20; and c) 3 parts dibutyl tin bisisooctylthio-glycolate thermo-stabilizer, T-31 by M&T Corporation (hereafter referred to as "thermo-stabilizer")

2. SBS+EO/ECH: the following was heat mixed together: a) 50 parts maleic anhydride grafted S-B-S copolymer, KRATON G by Shell Chemical Company (hereafter referred to as SBS); b) 100 parts of a copolymer of EO/ECH (in a weight ratio of about 80:20); c) 1 part antioxidant; and d) 3 parts thermo-stabilizer.

3. PLASTICIZED EO/ECH: The following was heat mixed together a) 100 parts of a copolymer of EO/ECH (in a weight ratio of about 80:20); b) 1 part antioxidant; c) 3 parts thermo-stabilizer; and d) 10 parts polyethylene glycol plasticizer, CARBOWAX PEG 400 manufactured by Fisher Scientific (hereafter referred to as "Plasticizer").

4. SBS+PLASTICIZED EO/ECH: The following was heat mixed together a) 20 parts SBS; b) 100 parts of a copolymer of EO/ECH (in a weight ratio of about 80:20); c) 1 part antioxidant; d) 3 parts thermo-stabilizer; and e) 10 parts plasticizer.

Static charge decay rates were measured at 20° C., 15% relative humidity. The results are summarized in Table 2.

Example 2:
(SBS+EO/ECH)+(POLYPROPYLENE) Two Stage Heat Mixing (20% EO/ECH)

31 parts of the SBS+EO/ECH mixture described above (Ingredient #2) was heat mixed with 70 parts Polypropylene and 0.7 parts antioxidant. The resulting composition had excellent electrostatic dissipating properties The surface resistivity was $10^{12}$ Ohms per square (all surface resistivity values given herein indicate "Ohms per square" unless otherwise stated), and the 90%/99% decay times were 0.19/0.79 seconds respectively (all decay times given herein indicate "seconds" unless otherwise stated).

Polypropylene and SBS do not provide electrostatic dissipating properties by themselves, while EO/ECH is an excellent electrostatic dissipating material. Further investigation showed that for a Polypropylene+EO/ECH one step heat mixed material to have excellent electrostatic dissipating properties, the EO/ECH content had to be about 40% by weight or greater, and for an SBS+EO/ECH heat mixed material to have excellent electrostatic dissipating properties, the EO/ECH content had to be about 30% by weight (all percentages herein are by weight unless otherwise indicated) or greater. Surprisingly however, a two step blend of the three components only required less than about 20% EO/ECH to obtain excellent electrostatic dissipating properties.

Example 3: SBS+EO/ECH+POLYPROPYLENE One Stage Heat Mixing (20% EO/ECH)

The individual ingredients found in Example 2 were combined and heat mixed together in a single step, and the resulting composition had a surface resistivity of $10^{14}$ and 90%/99% decay times of 1 and greater than 5, respectively (poor electrostatic dissipating properties).

Unlike Example 2, an amount of EO/ECH less than about 20% was insufficient to provide electrostatic dissipating properties. Based upon work with Polypropylene+EO/ECH (requiring at least about 40% EO/ECH for excellent electrostatic dissipating properties) and SBS+EO/ECH (requiring at least about 30% EO/ECH for excellent electrostatic dissipating properties), it is theorized that if the relative amount of EO/ECH were raised to between about 30% and 40% by weight, then excellent electrostatic dissipating properties could be achieved, and this is indicated by Examples 11 and 13 below.

However, EO/ECH is typically added only for its electrostatic dissipating properties, and such an excessive amount of EO/ECH to obtain the intended electrostatic dissipating properties might also cause other properties of the EO/ECH which may be undesirable to also show themselves in the final material.

Example 4: (PLASTICIZED EO/ECH)+(POLYPROPYLENE) Two Stage Heat Mixing (20 parts EO/ECH)

23 parts PLASTICIZED EO/ECH (Ingredient 3 listed above) was heat mixed with 76 parts Polypropylene and 0.76 parts antioxidant. The surface resistivity was $10^{11}$ and the 90%/99% decay times were 0.07/0.5 (good electrostatic dissipating properties).

Example 5: PLASTICIZED EO/ECH+POLYPROPYLENE One Stage Heat Mixing (20 parts EO/ECH)

The individual ingredients found in the composition of Example 4 were heat mixed together in a single step, and the resulting composition had a surface resistivity of $10^{13}$, and 90%/99% decay times of greater than 3 and greater than 5 respectively (poor electrostatic dissipating properties).

Example 6: (PLASTICIZED EO/ECH)+(POLYPROPYLENE) Two Stage Heat Mixing (30 parts EO/ECH)

34 parts plasticized EO/ECH was heat mixed with 65 parts Polypropylene and 0.65 parts antioxidant. The surface resistivity was $10^{10}$ and the 90%/99% decay times were 0.01/0.04 (excellent electrostatic dissipating properties).

Example 7: PLASTICIZED EO/ECH+POLYPROPYLENE One Stage Heat Mixing (30 parts EO/ECH)

The individual ingredients in the composition of Example 6 were heat mixed together in a single step, and the resulting composition had a surface resistivity of about $10^{12.5}$, and 90%/99% decay times of 0.06/0.4, respectively (much poorer electrostatic dissipating properties than in Example 6).

Example 8: (PLASTICIZED EO/ECH)+(POLYPROPYLENE) Two Stage Heat Mixing (40 parts EO/ECH)

46 parts PLASTICIZED EO/ECH was heat mixed with 55 parts Polypropylene and 0.55 parts antioxidant. The surface resistivity was $10^{10}$, and the 90%/99% decay times were 0.01/0.01.

Example 9: PLASTICIZED EO/ECH+POLYPROPYLENE One Stage Heat Mixing (40 parts EO/ECH)

The individual ingredients for the composition of Example 7 were heat mixed together in a single step, and the resulting composition had a surface resistivity of about $10^{12}$ and 90%/99% decay times of 0.02/0.08, respectively (much poorer electrostatic dissipating properties than in Example 8).

Example 10: (SBS+PLASTICIZED EO/ECH)+(POLYPROPYLENE) Two Stage Heat Mixing (20 parts EO/ECH)

27 parts SBS+Plasticized EO/ECH (Ingredient 4 listed above) was blended with 72 parts polypropylene and 0.72 parts antioxidant. The surface resistivity was $10^{12}$ and the 90%/99% decay times were 0.04/0.25 (very good electrostatic dissipating properties). Example 11: SBS+PLASTICIZED EO/ECH+POLYPROPYLENE One Stage Heat Mixing (20 parts EO/ECH)

The individual ingredients of Example 10 were blended together in a single step, and the resulting composition had a surface resistivity of $10^{14}$, and 90%/99% decay times of 1.01 and greater than 5 respectively (very poor electrostatic dissipating properties). Example 12: (SBS+PLASTICIZED EO/ECH)+(POLYPROPYLENE) Two Stage Heat Mixing (30 parts EO/ECH)

40 parts SBS+Plasticized EO/ECH was heat mixed with 60 parts Polypropylene and 0.6 parts antioxidant. The surface resistivity was $10^{10}$, and the 90%/99% decay times were 0.01/0.04 (excellent electrostatic dissipating properties).

Example 13: SBS+PLASTICIZED EO/ECH+POLYPROPYLENE One Stage Heat Mixing (30 Parts EO/ECH)

The ingredients of Example 12 were heat Mixed together in a single step, and the resulting composition had a surface resistivity and 90%/99% decay times essentially the same as Example 12.

The above Examples are summarized in Table 2.

TABLE 2

| Example | Composition | Heat Mixing | Antistatic Properties |
|---|---|---|---|
| 2 | (SBS + EO/ECH) + (Polypropylene) (20% EO/ECH) | two stage | excellent |
| 3 | (SBS + EO/ECH) + (Polypropylene) (20% EO/ECH) | one stage | very poor |
| 4 | (Plasticized EO/ECH) + (Polypropylene) (20% EO/ECH) | two stage | good |
| 5 | Plasticized EO/ECH + Polypropylene (20% EO/ECH) | one stage | very poor |
| 6 | (Plasticized EO/ECH) + (Polypropylene) (30% EO/ECH) | two stage | excellent |
| 7 | Plasticized EO/ECH + Polypropylene (30% EO/ECH) | one stage | good |
| 8 | (Plasticized EO/ECH) + (Polypropylene) (40% EO/ECH) | two stage | excellent |
| 9 | Plasticized EO/ECH + Polypropylene (40% EO/ECH) | one stage | good |

TABLE 2-continued

| Example | Composition | Heat Mixing | Antistatic Properties |
|---|---|---|---|
| 10 | (SBS + Plasticized EO/ECH) + (Polypropylene) (20% EO/ECH) | two stage | very good |
| 11 | SBS + Plasticized EO/ECH + Polypropylene" (20% EO/ECH) | one stage | very poor |
| 12 | (SBS + Plasticized EO/ECH) + (Polypropylene) (30% EO/ECH) | two stage | excellent |
| 13 | SBS + Plasticized EO/ECH + Polypropylene (30% EO/ECH) | one stage | excellent |

As can be seen by the above examples, electrostatic dissipating properties are generally improved where polymer blending is done in a two step fashion. Preferably, the oxirane copolymer (second component) is first heat mixed with a plasticizer, processing aid, impact modifier, and/or the like (third component); the remaining component is then added in a second heat mixing process.

The two step blending requires less (relative to one step blending) of the electrostatic dissipating second component to achieve comparable electrostatic dissipating performance. The improvement is best seen at lower levels of the second component. As the relative amount of second component is increased, the performance of the one step and two step processes seem to ultimately become substantially the same. Therefore ordinary skill and experimentation may be necessary for any particular embodiment of the present invention to determine the appropriate amounts of the various components.

In general, the second component is more expensive than the other components and is added primarily to provide electrostatic dissipating properties. If the second component is added in amounts greater than is absolutely necessary, the cost of the final blend is generally increased and unwanted properties of the second component may become more evident in the final material. The present invention is therefore quite advantageous, because it allows for lower concentrations of the second component than would be obtained in a conventional one step blending process.

Compositions of the present invention have been found to provide surprisingly effective surface resistivity for electrostatic dissipating applications, as well as good dimensional stability, ductility and the like.

Those skilled in the art will readily recognize and perhaps make changes to the above invention. It is to be understood that an equivalent of changes and modifications of the embodiments described above are also contemplated by the present invention. The examples are not to be construed as limitations upon the present invention, but are included merely to illustrate the various embodiments.

What is claimed is:

1. A method of manufacturing an electrostatic dissipating material, said method comprising:

heat mixing or blending a first, a second and a third component in two steps, whereby in the first step the second and third components are first heat mixed or blended together to provide an initial mixture and then in a second step the first component is heat mixed or blended with said initial mixture, said first component being a polyolefinic, urethane, condensation, vinylic or styrenic polymers, said second component being an oxirane copolymer which is substantially the polymer product of the following comonomers;

i) ethylene oxide in the range from about 5% to about 95% by weight; and ii) at least one heterocyclic comonomer in the range of from about 95% to about 5% by weight, wherein the cyclic comonomer comprises a ring comprising an oxygen atom and at least 2 carbon atoms;

and said third component being a polymer additive, whereby the amount of the second component is less than the amount necessary to obtain the same performance in a conventional one step process of the same material composition and the electrostatic dissipating material has a 90% decay time of not more than 0.5 seconds and a 99% decay time of not more than 2.0 seconds.

2. The method of claim 1 wherein the second component is further defined as comprising the polymer product of the following monomers:

a) ethylene oxide, and b) epihalohydrin or propylene oxide; wherein the weight ratio of the ethylene oxide to the remaining comonomer(s) is greater than about 1:1.

3. The method of claim 2 wherein the weight ratio of ethylene oxide to the remaining comonomer(s) is greater than about 2:1.

4. The method of claim 1 wherein the third component is further defined as comprising a plasticizer, stabilizer, antioxidant, antiozonant, filler, fiber, or impact modifier.

5. The method of claim 4 wherein the first component is further defined as comprising PVC or a polyolefin.

6. The method of claim 1 wherein mixing is accomplished using an extruder, and the two step mixing is accomplished by adding the second and third component at a first location along an extruder screw and the first component is added at a second location along the extruder screw, wherein said first location and said second location are different.

* * * * *